(12) United States Patent
Schroeder

(10) Patent No.: US 9,737,980 B2
(45) Date of Patent: Aug. 22, 2017

(54) FLUID FILTER INSTALLATION TOOL

(71) Applicant: Eaton Corporation, Cleveland, OH (US)

(72) Inventor: Ryan Joseph Schroeder, Van Wert, OH (US)

(73) Assignee: Eaton Corporation, Cleveland, OH (US)

( * ) Notice: Subject to any disclaimer, the term of this patent is extended or adjusted under 35 U.S.C. 154(b) by 355 days.

(21) Appl. No.: 14/209,104

(22) Filed: Mar. 13, 2014

(65) Prior Publication Data

US 2014/0310931 A1   Oct. 23, 2014

Related U.S. Application Data

(60) Provisional application No. 61/779,636, filed on Mar. 13, 2013.

(51) Int. Cl.
| | |
|---|---|
| *B25B 27/02* | (2006.01) |
| *B25B 27/00* | (2006.01) |
| *B01D 46/00* | (2006.01) |

(52) U.S. Cl.
CPC ........ *B25B 27/0042* (2013.01); *B01D 46/008* (2013.01); *B25B 27/026* (2013.01); *Y10T 29/49718* (2015.01); *Y10T 29/53848* (2015.01)

(58) Field of Classification Search
CPC . B25B 27/0042; B25B 27/026; B01D 46/008; B01D 2201/24; B01D 35/306; Y10T 29/49718; Y10T 29/53848
See application file for complete search history.

(56) References Cited

U.S. PATENT DOCUMENTS

| | | | |
|---|---|---|---|
| 1,435,278 A * | 11/1922 | Campbell | ............ B25B 27/062 29/263 |
| 6,176,263 B1 * | 1/2001 | Lacroix | ................... F16L 29/04 137/614 |
| 2010/0251528 A1 * | 10/2010 | Hu | ........................ B25B 27/026 29/252 |

* cited by examiner

*Primary Examiner* — Sarang Afzali
*Assistant Examiner* — Ruth G Hidalgo-Hernandez
(74) *Attorney, Agent, or Firm* — Fishman Stewart PLLC

(57) ABSTRACT

An installation tool for one or more components of a fluid filter includes a first body portion configured to engage a filter socket to advance the tool and filter components into the socket, and a second body portion configured to apply a direct force to one or more filter components. The first and second body portions can rotationally move relative to each other, such that the filter components may not grind against the socket or other filter components, which can, among other things, reduce or eliminate the creation of foreign object debris and/or minimize the amount of human force required to install the filter components.

9 Claims, 7 Drawing Sheets

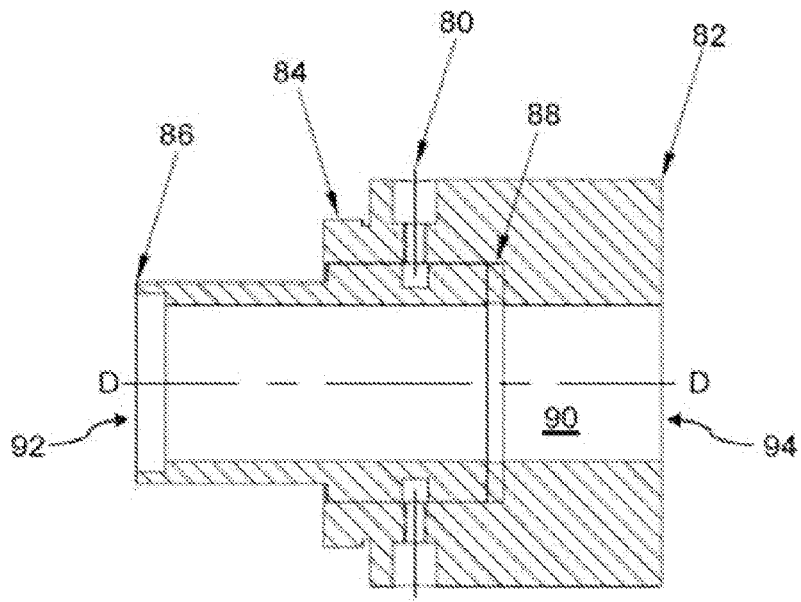
FIG. 3
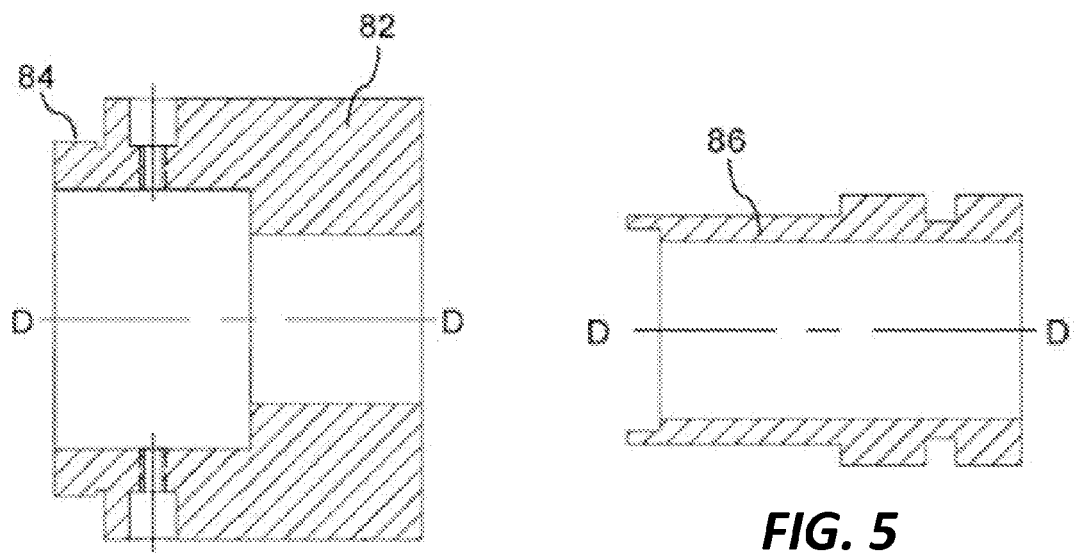
FIG. 4
FIG. 5

FLUID FILTER INSTALLATION TOOL

CROSS-REFERENCE TO RELATED APPLICATIONS

This application claims the benefit of U.S. Provisional Application Ser. No. 61/779,636, filed Mar. 13, 2013, the disclosure of which is incorporated herein by reference in its entirety.

GOVERNMENT LICENSE RIGHTS

This invention was made with government support under contract number N00019-06-C-0081 awarded by the Department of the Navy—Naval Air Systems Command. The government has certain rights in the invention.

BACKGROUND

1. Technical Field

The present disclosure relates generally to fluid filtration components, including fluid filters and installation tools for fluid filters.

2. Description of the Related Art

Hydraulic actuators are used in a number of industries for many different applications. In particular, hydraulic actuators find use throughout many types of aircraft. Hydraulic actuation systems can include a number of moving parts in contact with circulating hydraulic fluid. If undesired foreign object debris and other contaminants are in the fluid, moving components in contact with the fluid may wear faster than usual, or may fail entirely. Thus, for hydraulic systems in aircraft, other vehicles, and other industries, sufficiently clean hydraulic fluid can be an important factor in connection with the function and longevity of the various components of the system.

Fluid filters are generally placed in hydraulic actuation systems—before the load (i.e., a supply filter) after the load (i.e., a return filter), or both. With one or more filters, contaminants can be removed from the hydraulic fluid before reaching (and potentially harming) moving parts in the actuation system. Because filters, like all components, may face mechanical issues, different parts of a filter may need to be replaced periodically. Replacement of some filter parts (as well as a first installation of such filter parts during an initial build of the system) may be expedited utilizing of one or more specialized tools. During the installation process for a filter, as during operation of the actuation system, it is desirable to minimize the amount of foreign object debris in the hydraulic fluid while minimizing the amount of human force required to install the filter. Known filter installation tools and processes may not adequately address these needs.

SUMMARY

A filter installation tool for a hydraulic fluid filter can include one or more features to, among other things, reduce the exposure of the filtered fluid to foreign object debris and/or reduce the human force required to install the filter. An embodiment of such a tool can include a first body portion comprising a threaded surface that may be configured to advance the first body portion toward said socket when the first body portion is rotated, and a second body portion connected to the first body portion, the second body portion may be configured to engage said one or more filter components and advance said one or more filter components into said socket. The first body portion and the second body portion may be configured to rotate relative to each other such that said one or more filter components can be advanced into said socket without substantial rotation relative to said socket.

BRIEF DESCRIPTION OF THE DRAWINGS

Embodiments of the present disclosure will now be described, by way of example, with reference to the accompanying drawings, wherein:

FIG. 3 is a cross-sectional view of an embodiment of a filter installation tool according to the present disclosure.

FIGS. 4 and 5 are more detailed cross-sectional views of components of the filter installation tool of FIG. 3.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by appended claims.

Figure 1:
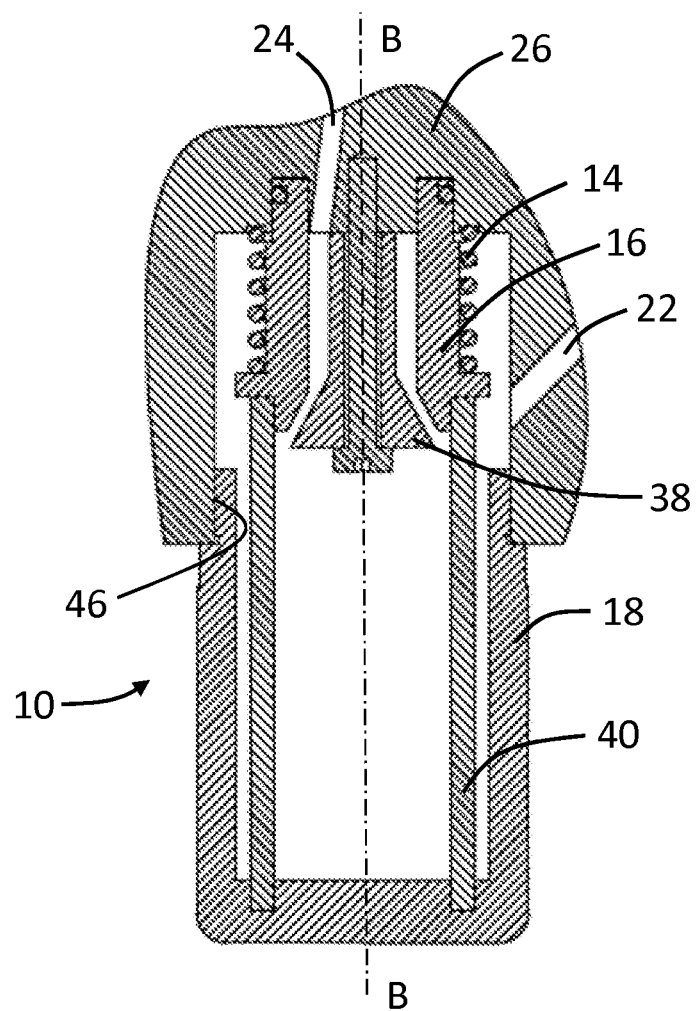
FIG. 1 is a cross-sectional view of an embodiment of a filter kit, shown disposed in a filter installation socket.

FIG. 1 is a cross-sectional view of an embodiment of a filter kit 10 with the kit 10 shown disposed in a filter socket 26. The filter kit 10 may be used, for example only, to filter hydraulic fluid in an aircraft hydraulic actuation system. The filter kit 10 can comprise a number of components, including a spring 14, a filter valve 16, a filter cup 18, a fluid inlet 22, a fluid outlet 24, and numerous other portions and components.

In an embodiment, a filter kit 10 can be a filter kit of the type generally known in the art. For example only, the filter kit 10 can be a hydraulic fluid filter manufactured by Pall Corporation of Port Washington, N.Y. The filter kit 10 may have technical specifications desirable for an aircraft hydraulic actuation system. For example, the filter kit 10 (and the various components thereof) may be designed and constructed for an operating fluid pressure of about 2000 p.s.i., and may be able to withstand fluid pressure of up to 4000 p.s.i. or more. The filter kit 10 may be able to operate at a wide range of temperatures, with an appropriate flow rating (such as, for example only, 40 gallons per minute) and pressure drop-off (such as, for example only, about 32 p.s.i.). The filter kit 10 may also include a differential pressure indicator and switch and other features known in the art.

In addition to the spring 14, the filter valve 16, filter cup 18, fluid inlet 22, and fluid outlet 24, the filter kit 10 may also comprise a number of other components, including a valve piece, a plurality of retainers and rings, a bolt 38, and a filter element 40. Both the filter kit 10 and the filter socket 26 can share a longitudinal axis B-B.

The filter element 40 can be the principal element of the filter kit 10 for removal of particles and debris from the fluid between the inlet 22 and outlet 24. Accordingly, other elements associated with the filter kit 10 may be provided, in part, to secure the filter element 40 within the flow path of a circulating fluid, as may be the filter socket 26. The filter element 40 can be a filter element including those known in the art, and can conform with general filtering requirements for a particular industry or application. In an embodiment, the filter element 40 can be configured for use in an aircraft hydraulic actuation system, and, for certain embodiments, can comprise Ultipor™ resin-impregnated organic and inorganic fibers. For example only, and without limitation, the filter element 40 may be configured to capture all particles having a diameter of about 5 micrometers or more.

Use of the filter kit 10 (i.e., use of a device, apparatus, or system in which the filter kit 10 is disposed) may result in wear and tear to various components of the filter kit 10 and eventually such components may require replacement. In addition, the components of the filter kit 10 may be installed in the filter socket 26 during an initial build of the system of which the socket 26 is a part. Some components, such as the filter element 40, may be relatively easy to install and replace. Other components, such as the spring 14 and filter valve 16, may be comparatively more difficult to install and replace, and may require one or more specialized tools.

Figure 2:
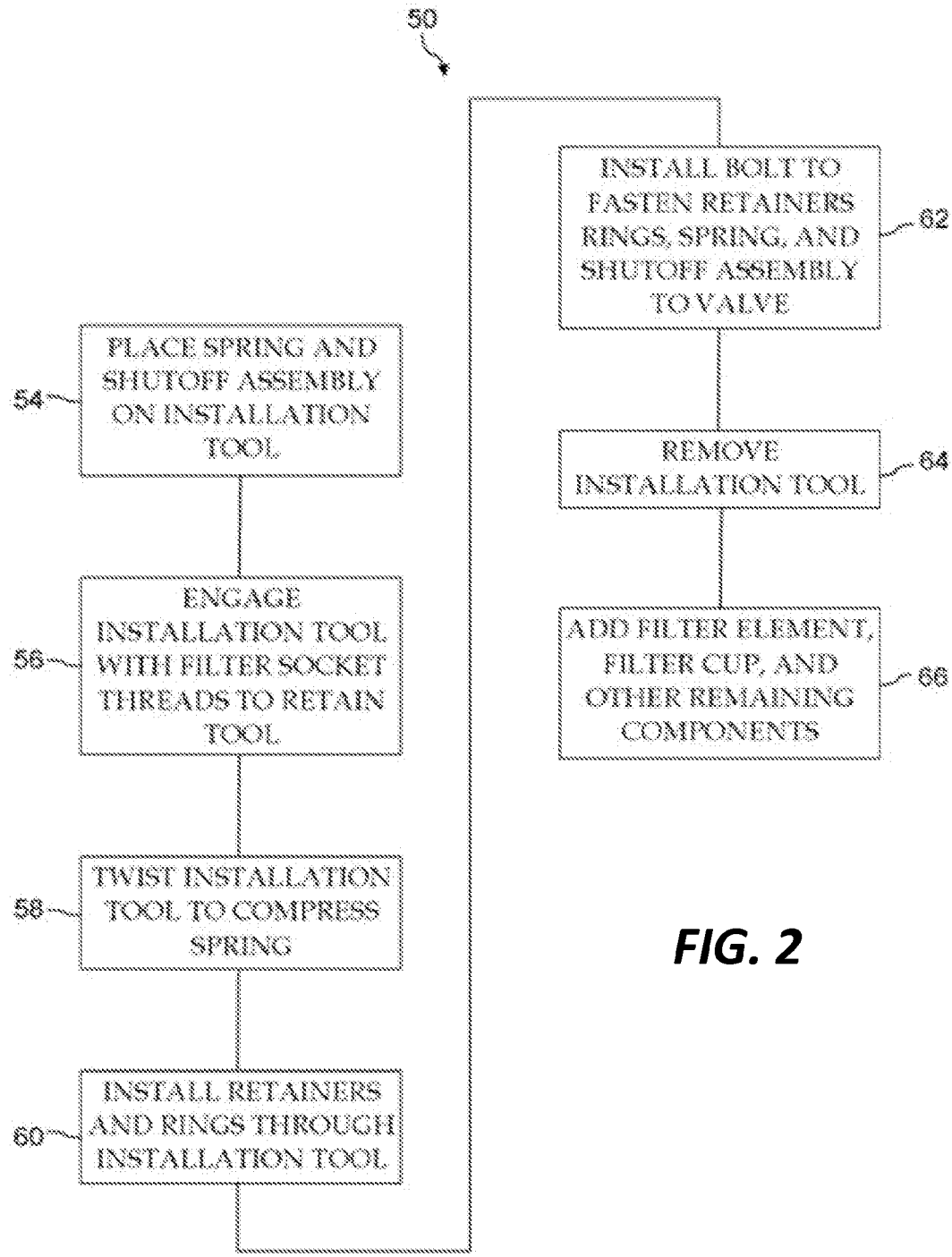
FIG. 2 is a flow chart illustrating a method of installing the filter kit of FIG. 1 in a socket.

FIG. 2 is a flow chart illustrating an embodiment of a method 50 of installing a filter kit in a filter socket. The method will be described with general reference to the filter kit 10 and the filter socket 26 shown in FIG. 1. However, the method 50 can apply to other filters and filter sockets as well. In addition, the particular steps of the method 50 can be modified to reflect different structures and components of such other filters and filter sockets.

The method 50 can begin with a step 54 by placing the spring 14 and filter valve 16 on or in engagement with an installation tool for insertion into the socket 26. The method can continue to a step 56 with engaging the installation tool with filter socket threads to retain the installation tool in the filter socket 26. With the installation tool engaged with the filter socket threads, the method can continue to a step 58 with twisting the installation tool to compress the spring 14 and advance the spring 14 and filter valve 16 into the filter socket 26. In embodiments, the installation tool can be screwed in to the filter socket 26 about axis B-B to compress the spring 14 along axis B-B.

With the installation tool still in place (i.e., still engaged with the filter socket 26), other internal components of the filter kit 10 can be installed at step 60. For example, the plurality of retainers and rings can be installed. The retainers and rings can be installed, in an embodiment, through a hollow passageway in the installation tool. Once the retainers and rings are in place, the method can continue to a step 62 which involves installing the bolt 38 to fasten the retainers, rings, spring, and filter valve in place. In an embodiment, the bolt 38 may be screwed into a portion of the filter socket 26.

After the bolt 38 is in place, the installation tool can be removed from the filter socket 26 at step 64, and the remaining components (such as the filter element 40 and filter cup 18) of the filter kit 10 can be installed at step 66.

Tools according to conventional designs that may be used to install a filter in a filter socket as described in the method 50 may generally include a single-piece body having a threaded outer surface and a hollow central passageway. As described in the method 50 above, the threaded outer surface can engage a threaded inner surface in a filter socket. As the tool is screwed into the filter socket, components of the filter carried in the tool are advanced into the filter socket.

However, the use of such conventional tools can have several shortcomings. First, the spring 14 and filter valve 16 may rotate as the conventional tool is screwed in. As a result, the spring 14 may grind against the filter socket 26 or other components and scrape material off of the spring 14 and/or the filter socket 26, which can create foreign object debris on the "clean" side of the filter element 40 that can freely flow to moving components of the system. In a hydraulic system embodiment, such free flow of foreign object debris can reduce the life of system components, or cause one or more components to cease functioning entirely.

A second potential shortcoming of conventional tools is the high amount of force required to initially engage the threaded surfaces of the tool and the filter socket because of the resistance of the spring 14. Because the tool may be small (in embodiments, only a few inches in both length and diameter), and because the space in which the filter is installed may be confined, applying sufficient force can be difficult. An inventive installation device or tool may improve on one or more shortcomings associated with conventional tools.

FIG. 3 is a cross-sectional view of a first embodiment of a filter installation tool 80 with improved features and functionality. The first tool 80 can be used, for example and without limitation, to install a supply-line and/or a return-line filter in an aircraft hydraulic actuation system. The first tool 80 can include an outer body portion 82 having a threaded outer surface 84, an inner body portion 86, a bearing assembly 88, and a longitudinal passageway 90 extending from an upper orifice 92 to a lower orifice 94 along a longitudinal axis D-D. The bearing assembly 88 can be disposed between the body portions 82, 86 to allow for relative rotational motion between the body portions 82, 86. A more detailed view of the outer body portion 82 is shown in FIG. 4, and a more detailed view of the inner body portion 86 is shown in FIG. 5.

The first installation tool 80 can function similarly to the installation process described in the method 50 while improving on at least one shortcoming of conventional tools. Referring to FIGS. 1 and 3, the spring 14 and filter valve 16 can be placed in the upper orifice 92 and advanced into the filter socket 26. The threaded outer surface 84 of the outer body portion can engage with the threaded inner surface 46 of the filter socket, thus advancing both the inner and outer body portions 86, 82 longitudinally into the filter socket 26 and compressing the spring 14 as the outer body portion 82 is screwed into the filter socket 26.

The relative rotational motion between the outer and inner body portions 82, 86 can improve on a shortcoming noted above with respect to conventional tools. As the outer body portion threaded surface 84 engages the threaded inner surface 46 of the filter socket 26, the outer body portion 82 is rotated to advance longitudinally into the filter socket 26. However, the inner body portion 86 (which applies the direct longitudinal force to the filter valve 16 and the spring 14) can remain substantially rotationally stationary relative to the filter socket 26. As a result, the filter valve 16 and spring 14 can remain substantially rotationally stationary relative to the filter socket 26, and the spring 14 can be prevented from grinding against the filter socket 26 or other components. Thus, the creation of foreign object debris from such grinding can be reduced or eliminated.

Once the filter valve 16 and the spring 14 are in the place, the first installation tool 80 can remain screwed in the filter socket 26 and the plurality of retainers and rings, and the bolt 38 can be installed through the central passageway 90, such as generally described in the method 50. The first installation tool 80 can then be removed from the filter socket 26 to allow the remaining components of the filter to be installed.

Figure 6:
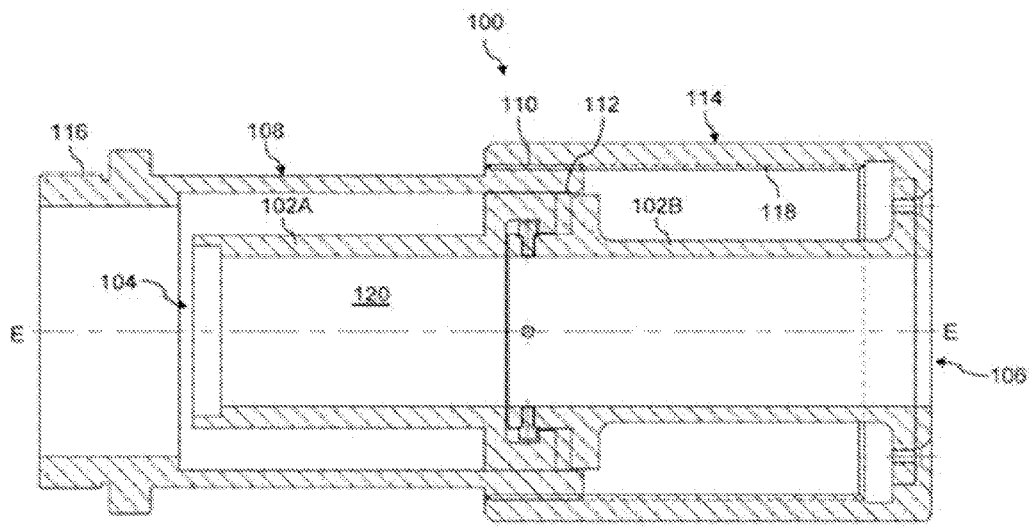
FIG. 6 is a cross-sectional view of an embodiment of a filter installation tool according to the present disclosure in a retracted state.
Figure 9:
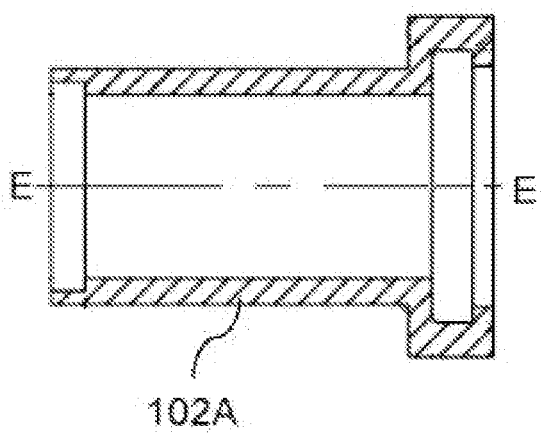
FIGS. 9-12B are more detailed views of various components of the tool of FIGS. 6 and 7.
Figure 10:
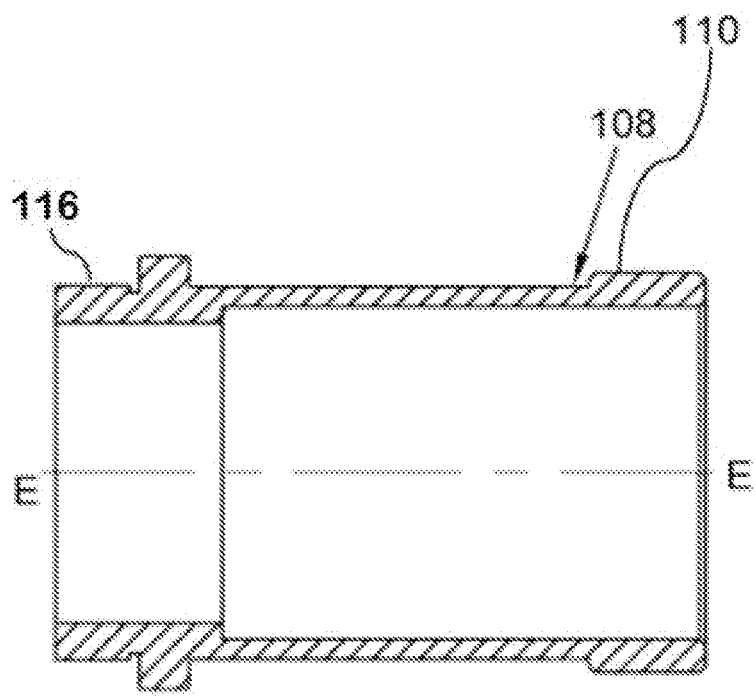
Figure 11:
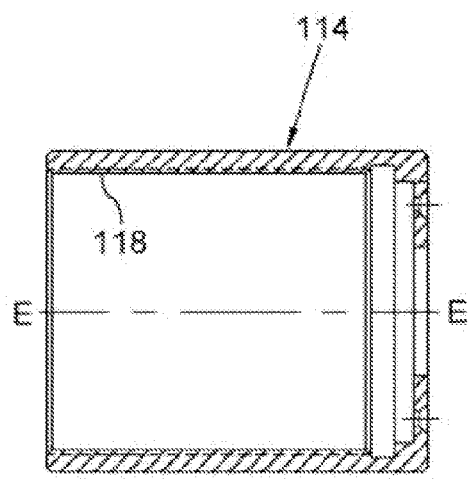
Figure 12A:
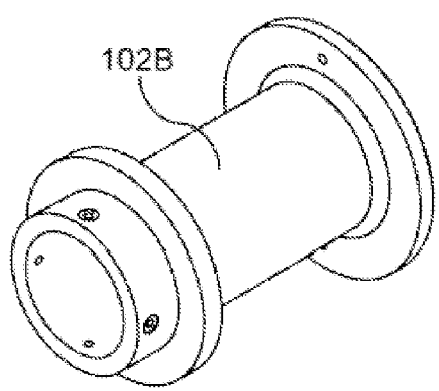
Figure 12B:
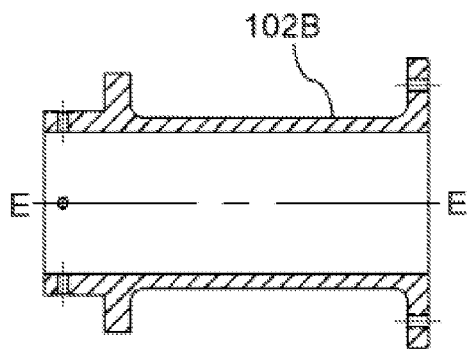

FIG. 6 is a cross-sectional view of a second embodiment of a filter installation tool 100 that also demonstrates improved features or function. The second tool 100 can be used, for example and without limitation, to install a supply-line filter and/or return-line filter in an aircraft hydraulic actuation system. The second tool 100 can include an inner body portion 102 having an upper orifice 104, a lower orifice 106, an upper piece 102A (shown in greater detail in FIG. 9), and a lower piece 102B (shown in greater detail in FIGS. 12A and 12B), an intermediate body portion 108 (shown in greater detail in FIG. 10) having a first outer threaded surface 110 and a second outer threaded surface 116, a bearing assembly 112 for relative motion between the upper and lower pieces 102A, 102B of the inner body portion, and an outer body portion 114 (shown in greater detail in FIG. 11) having an inner threaded surface 118. Each of the body portions can be arranged about a central passageway 120 extending along a longitudinal axis E-E. FIG. 6 illustrates the second tool 100 with the inner body portion 102 in a retracted state relative to the intermediate body portion 108.

Various relative movements of the body portions can take place. The intermediate body portion 108 can move longitudinally and rotationally relative to the outer body portion 114 via the interaction between the threaded outer surface 110 of the intermediate body portion and the threaded inner surface 118 of the outer body portion. The intermediate body portion 108 can similarly move longitudinally and rotationally relative to the inner body portion 102 due to a circumferential space between the body portions. The outer body portion 114 and inner body portion 102 can move rotationally relative to each other, but generally move longitudinally in unison. As noted above, the upper and lower pieces 102A, 102B of the inner body portion can move rotationally relative to each other via the bearing assembly 112.

Figure 7:
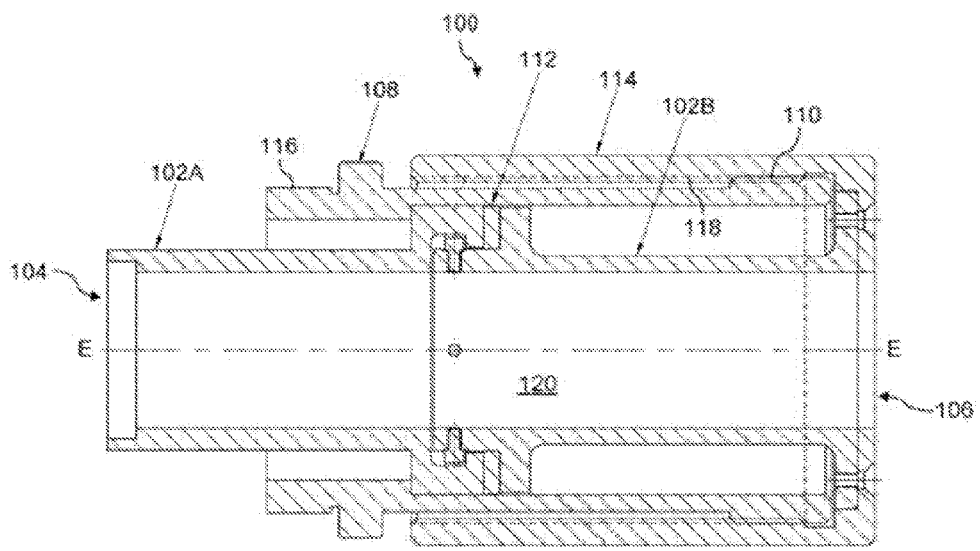
FIG. 7 is a cross-sectional view of the tool of FIG. 6 in an extended state.
Figure 8A:
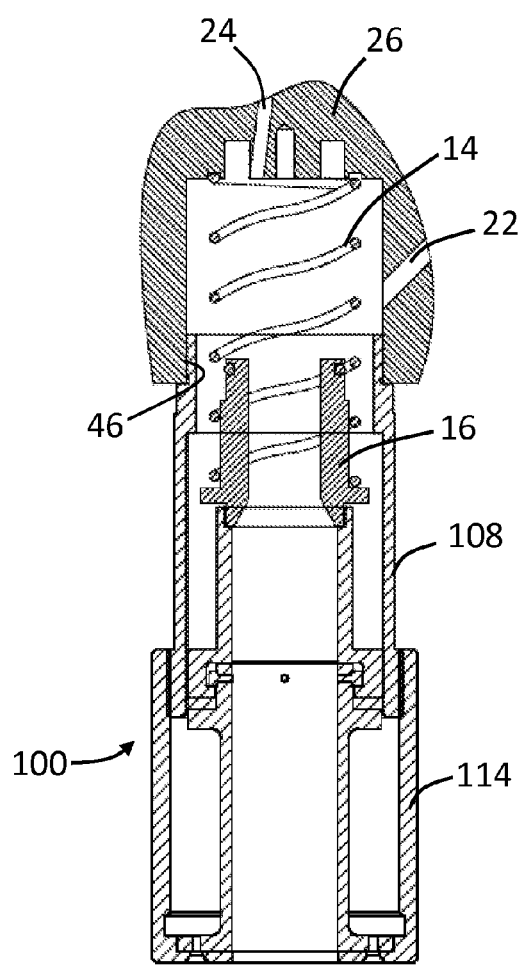
FIG. 8A is a cross-sectional view of the filter installation tool of FIG. 6 shown disposed in the filter installation socket in the retracted state.
Figure 8B:
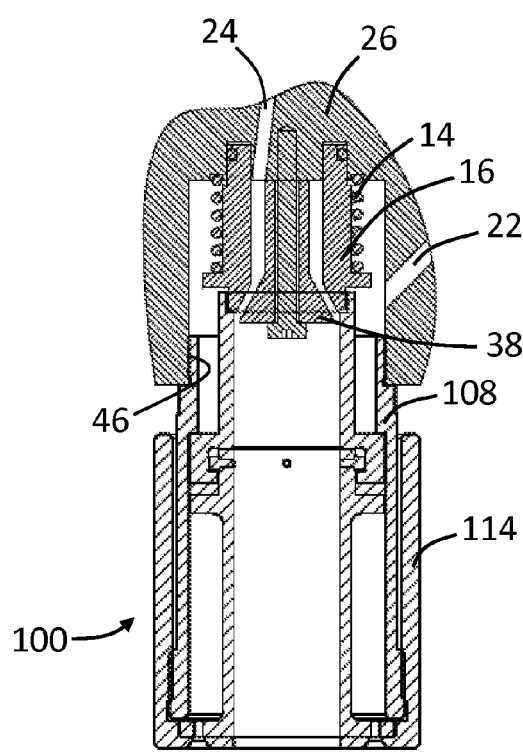
FIG. 8B is a cross-sectional view of the filter installation tool of FIG. 7 shown disposed in the filter installation socket in the extended state.

Referring to FIGS. 6 and 8A, the upper orifice 104 of the inner body portion can be configured to receive the spring 14 and filter valve 16. Accordingly, the inner body portion 102 can apply a direct longitudinal force to the spring 14 and filter valve 16 to compress the spring 14 against the filter socket 26. The intermediate body portion 108 can engage the filter socket 26 via the second outer threaded surface 116. As the intermediate body portion 108 engages (e.g., is "screwed in to") the filter socket 26, the spring 14 remains in a substantially uncompressed state. Once the intermediate body portion 108 is engaged with the filter socket 26, the outer body portion 114 can be rotated relative to the intermediate body portion 108. By virtue of the threaded interaction between the outer body portion 114 and intermediate body portion 108, the inner body portion 102 gradually extends from the intermediate body portion 108 to compress the spring 14 and properly position valve 16 so that bolt 38 can be installed. FIGS. 7 and 8B are cross-sectional views of the second tool 100 with the inner body portion 102 shown in an extended state.

The presence of the intermediate body portion 108 prevents the spring 14 from immediately opposing the screwing motion of the outer body portion 114. As a result, less force is required for an initial threading of the outer body portion 114 in the filter socket 26, thereby improving on a potential shortcoming of conventional tools. Of course, the second tool 100 may also improve on the first shortcoming of conventional tools identified above. In an embodiment, the upper and lower pieces 102A, 102B of the inner body portion may be able to rotate relative to each other via the bearing assembly 112. In an embodiment, the lower piece 102B may be rigidly coupled to the outer body portion 114. Thus, there can be relative rotational motion between the outer body portion 114 and the upper piece 102A of the inner body portion. Due to the relative rotational motion between the upper piece 102A of the inner body portion 102 (which applies a direct force to the filter valve 16 and spring 14) and the outer body portion 114 (which advances the inner body portion 102, filter valve 16, and spring 14 longitudinally via interaction with the threaded surface 46 in the filter socket 26) via the bearing assembly 112, the spring 14 can be substantially prevented from grinding against the filter socket 26 or other components to reduce or eliminate the creation of foreign object debris from such grinding.

Although the first and second filter tools 80, 100 are described above with respect to a supply-line filter and/or a return-line filter for an aircraft hydraulic actuation system, the dimensions and components of the filter tools 80, 100 can be modified for different filter types. For example, for a different filter, the inner body portion 86, 102 of the tool may extend less from the outer body portion 82, 114 because of the different dimensions of the filter and/or socket. Similarly, the intermediate body portion 108 may have a different cross-sectional profile because of a different internal shape of the filter socket. Of course, other modifications are possible and are intended to be considered within the scope of this disclosure.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed:

1. A device for installing one or more filter components in a socket, the device comprising:
   a first body portion including a threaded outside surface that is configured to engage said socket and to advance the first body portion toward said socket when the first body portion is rotated; and
   a second body portion connected to the first body portion, the second body portion configured to engage said one or more filter components disposed within the second body portion and advance said one or more filter components into said socket;
   wherein the first body portion and the second body portion are configured such that the second body portion remains substantially rotationally stationary relative to said socket as the threaded outside surface of the first body portion engages with the socket while advancing the first body portion and the second body portion toward the socket.

2. The device of claim 1, further comprising a bearing assembly disposed between the first body portion and the second body portion to enable relative rotation.

3. The device of claim 1, wherein the threaded outer surface of the first body portion is configured to engage a threaded surface of said socket.

4. The device of claim 1, wherein said second body portion is configured to engage a hydraulic filter valve assembly.

5. The device of claim 1, wherein said device is configured for use in an aircraft.

6. A device for installing one or more filter components in a socket, the device comprising:
   a first body portion comprising a threaded surface;
   a second body portion connected to the first body portion for rotation relative to the first body portion, the second body portion connected to an inner surface of the first body portion at one longitudinal end of the second body portion to enable longitudinal movement of the second body portion with the first body portion, and a ledge at an opposite longitudinal end of the second body portion configured to receive and engage said one or more filter components disposed within the second body portion and advance said one or more filter components into said socket; and
   a third body portion comprising a first threaded surface configured to engage the threaded surface of the first body portion and a second threaded surface configured to engage a threaded surface of said socket to support said device relative to said socket; wherein the third body portion is configured to enable said filter components to remain in a substantially uncompressed state prior to rotation of the first body portion relative to the third body portion, and rotation of the first body portion advances the second body portion into said socket without substantial rotation of a portion of the second body portion relative to said socket.

7. The device of claim 6, wherein the second body portion includes a first piece and a second piece, the first piece connected to the first body portion and the second piece connected to the first piece for rotation relative thereto.

8. The device of claim 7, further comprising a bearing assembly disposed between the first piece and the second piece of the second body portion to enable relative rotation.

9. The device of claim 6, wherein the first threaded surface of the third body is a threaded outer surface and the threaded surface of the first body is a threaded inner surface, and the second threaded surface of the third body is a threaded outer surface and the threaded surface of said socket is a threaded inner surface.

* * * * *